(12) United States Patent
Ohwe (10) Patent No.: US 7,110,220 B2
(45) Date of Patent: Sep. 19, 2006

(54) HEAD SLIDER HAVING PADS FORMED ON RAIL SURFACES

(75) Inventor: Takeshi Ohwe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/685,911

(22) Filed: Oct. 15, 2003

(65) Prior Publication Data

US 2004/0075947 A1 Apr. 22, 2004

Related U.S. Application Data (63) Continuation of application No. PCT/JP01/03404, filed on Apr. 20, 2001.

(51) Int. Cl.
*G11B 21/16* (2006.01)

(52) U.S. Cl. .................................. 360/235.8

(58) Field of Classification Search ............. 360/235.8, 360/236.6
See application file for complete search history.

(56) References Cited

U.S. PATENT DOCUMENTS

| | | | |
|---|---|---|---|
| 5,841,608 A * | 11/1998 | Kasamatsu et al. ...... | 360/236.6 |
| 6,754,043 B1 * | 6/2004 | Kasamatsu et al. ...... | 360/235.8 |
| 6,937,439 B1 * | 8/2005 | Chang et al. ............ | 360/235.8 |
| 2003/0184915 A1 * | 10/2003 | Kameyama et al. ..... | 360/235.8 |
| 2003/0206374 A1 * | 11/2003 | Ueda et al. .............. | 360/236.3 |

FOREIGN PATENT DOCUMENTS

| | | |
|---|---|---|
| JP | 10-011931 | 1/1998 |
| JP | 2000-173217 | 6/2000 |
| JP | 2000-306226 | 11/2000 |
| JP | 2001-006308 | 1/2001 |

* cited by examiner

*Primary Examiner*—David Davis
(74) *Attorney, Agent, or Firm*—Greer, Burns & Crain, Ltd.

(57) ABSTRACT

A head slider includes a plurality of pads formed on the front rail and at least one of the rear rails. Each pad has an inclined upper end surface with a given inclination angle such that the upstream end of the inclined upper end surface is higher in level than the downstream end thereof

8 Claims, 8 Drawing Sheets

HEAD SLIDER HAVING PADS FORMED ON RAIL SURFACES

This is a continuation of International PCT application Ser. No. PCT/JP01/03404 filed Apr. 20, 2001, which was not published in English.

BACKGROUND OF THE INVENTION

1. Field of the Invention

The present invention relates to a head slider for a disk drive.

2. Description of the Related Art

In recent years, a reduction in size and an increase in capacity of a magnetic disk drive as a kind of external storage device for a computer have been desired. One method of increasing the capacity of the magnetic disk drive is to increase the number of magnetic disks mounted on a spindle, and in association therewith the spacing between the magnetic disks in a recent magnetic disk drive has increasingly been reduced. In a recent magnetic disk drive, a flying type magnetic head slider adopting a contact start and stop (CSS) system has frequently been used. In such a flying type magnetic head slider adopting the CSS system, the magnetic head slider comes to contact with a magnetic disk when the disk drive stops operation, whereas the magnetic head slider is kept flying at a microscopic height from the disk surface by an air flow produced over the disk surface rotating at a high speed in recording or reproducing information.

In the flying type magnetic head slider adopting the CSS system, an electromagnetic transducer (magnetic head element) is built in the slider for receiving the air flow produced over the disk surface, and the slider is supported by a suspension. Accordingly, when the magnetic disk remains still, the slider including the electromagnetic transducer is in contact with the disk surface, whereas when the magnetic disk is rotated, a disk opposing surface of the slider opposed to the magnetic disk receives an air flow generated by rotation of the magnetic disk, and the slider flies from the disk surface. The electromagnetic transducer built in the slider is moved over the disk surface as being supported by the suspension to perform recording or reproduction of information at a given track.

In a magnetic disk drive employing a conventional flying type magnetic head slider, a pair of rails are provided on opposite side portions of a disk opposing surface of the magnetic head slider opposed to the disk surface. Each rail has a flat air bearing surface. Further, a tapering surface is formed on each rail so as to meet an air inlet end surface of the slider. The air bearing surface of each rail receives an air flow generated by high-speed rotation of a magnetic disk to fly the slider and stably maintains a microscopic distance between the disk surface and the electromagnetic transducer.

According to the CSS system, a high flying stability and a microscopic flying height (submicrons) can be ensured. However, when the disk remains still, rail surfaces (air bearing surfaces) of the slider are in contact with the disk. Accordingly, when the magnetic disk drive starts or stops operation, the air bearing surfaces relatively slides on the disk. To cope with such sliding, a protective film made of a hard material such as carbon and a lubricating layer for reducing friction and wear of the protective film to improve durability of the magnetic disk are formed on a recording layer of the disk. Owing to the presence of the lubricating layer, friction and wear of the protective film can be reduced. However, when the disk drive stops operation, there is a possibility that stiction between the disk and the slider may occur to cause a problem that the disk drive cannot be restarted.

To prevent the stiction between the disk and the head slider, there has been proposed a technique of reducing the contact area between the head slider and the disk surface by providing a plurality of pads (projections) on the flying surface (air bearing surface) of the head slider (e.g., Japanese Patent Laid-open No. 8-69674). Each pad for preventing the stiction in the prior art has a cylindrical shape uniform in diameter from the top to the bottom, and it is formed at right angles to the air bearing surface of the head slider. As another conventional head slider, each pad for preventing the stiction is formed on a step surface lower in level than the air bearing surface. In this case, the height of each pad from the step surface is set slightly larger than the height of the air bearing surface.

The diameter of each pad is set greater than or equal to a certain diameter in consideration of wearing of each pad and less than or equal to a certain diameter in consideration of a coefficient of friction. In considering a stiction margin, a higher pad is required. However, the height of each pad cannot be set larger than or equal to a certain height in consideration of a flying attitude of the head slider such that the position of the magnetic transducer becomes a lowest point of the head slider in its flying condition. In the case that each pad becomes closer to the disk surface than the magnetic transducer in the flying condition of the head slider, a spacing loss is produced to impair the performance of the disk drive. If the height of each pad is excessive, there is a possibility that each pad may come into contact with the disk surface to cause head crash. Thus, the height of each pad is limited, so that there arises a problem that the stiction between the head slider and the magnetic disk due to an initial error occurring in assembling or transporting the disk drive, causing the impairment of the reliability of the disk drive.

SUMMARY OF THE INVENTION

It is therefore an object of the present invention to provide a head slider which can enlarge the stiction margin between the head slider and the medium without any influence on the reliability of a head/disk interface.

In accordance with an aspect of the present invention, there is provided a head slider having an air inlet end, an air outlet end, and a disk opposing surface opposed to a disk, including a front rail formed on the disk opposing surface at a longitudinal position adjacent to the air inlet end, the front rail having a flat air bearing surface for generating a flying force during rotation of the disk; a pair of rear rails formed on the disk opposing surface at a longitudinal position adjacent to the air outlet end, each of the rear rails having a flat air bearing surface for generating a flying force during rotation of the disk; a groove formed downstream of the front rail for generating a negative pressure by expanding air once compressed at the front rail; a transducer formed near the air outlet end at a transverse position where one of the rear rails is formed; and a plurality of pads formed on the front rail and at least one of the rear rails; each of the pads having an inclined upper end surface with a given inclination angle such that the upstream end of the inclined upper end surface is higher in level than the downstream end thereof.

Each of the front rail and the rear rails has a step surface adjacent to the corresponding air bearing surface and lower in level than the corresponding air bearing surface, and each of the pads is formed on the step surface. Preferably, the given inclination angle is less than or equal to a pitch angle in flying the slider.

In accordance with another aspect of the present invention, there is provided a head slider having an air inlet end, an air outlet end, and a disk opposing surface opposed to a disk, including a front rail formed on the disk opposing surface at a longitudinal position adjacent to the air inlet end, the front rail having a flat air bearing surface for generating a flying force during rotation of the disk; a pair of rear rails formed on the disk opposing surface at a longitudinal position adjacent to the air outlet end, each of the rear rails having a flat air bearing surface for generating a flying force during rotation of the disk; a groove formed downstream of the front rail for generating a negative pressure by expanding air once compressed at the front rail; a transducer formed near the air outlet end at a transverse position where one of the rear rails is formed; and a plurality of pads formed on the front rail and at least one of the rear rails; each of the pads including a base pad having a first sectional area and an auxiliary pad formed on the base pad, the auxiliary pad having a second sectional area smaller than the first sectional area.

Preferably, the angle formed between a horizontal plane and a straight line connecting the downstream end of the upper end surface of the base pad and the downstream end of the upper end surface of the auxiliary pad is less than or equal to a pitch angle in flying the slider.

In accordance with a further aspect of the present invention, there is provided a head slider having an air inlet end, an air outlet end, and a disk opposing surface opposed to a disk, including a front rail formed on the disk opposing surface at a longitudinal position adjacent to the air inlet end, the front rail having a flat air bearing surface for generating a flying force during rotation of the disk; a pair of rear rails formed on the disk opposing surface at a longitudinal position adjacent to the air outlet end, each of the rear rails having a flat air bearing surface for generating a flying force during rotation of the disk; a groove formed downstream of the front rail for generating a negative pressure by expanding air once compressed at the front rail; a transducer formed near the air outlet end at a transverse position where one of the rear rails is formed; a plurality of pads formed on the front rail and at least one of the rear rails; and a plurality of auxiliary pads formed adjacent to the pads on the upstream side thereof, respectively; each of the auxiliary pads being higher in level than the pad adjacent thereto.

Preferably, each of the auxiliary pads has a sectional area smaller than that of each adjacent pad, and the angle formed between a horizontal plane and a straight line connecting the downstream end of the upper end surface of each auxiliary pad and the downstream end of the upper end surface of each adjacent pad is less than or equal to a pitch angle in flying the slider.

In accordance with a still further aspect of the present invention, there is provided a head slider having an air inlet end, an air outlet end, and a disk opposing surface opposed to a disk, including a pair of rails formed on the disk opposing surface, each of the rails having a flat air bearing surface for generating a flying force during rotation of the disk; a groove formed between the rails for generating a negative pressure by expanding air once compressed at the air inlet end; a transducer formed near the air outlet end at a transverse position where one of the rails is formed; and a plurality of pads formed on the air bearing surfaces of the rails; each of the pads having an inclined upper end surface with a given inclination angle such that the upstream end of the inclined upper end surface is higher in level than the downstream end thereof.

Preferably, the given inclination angle is less than or equal to a pitch angle in flying the slider.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
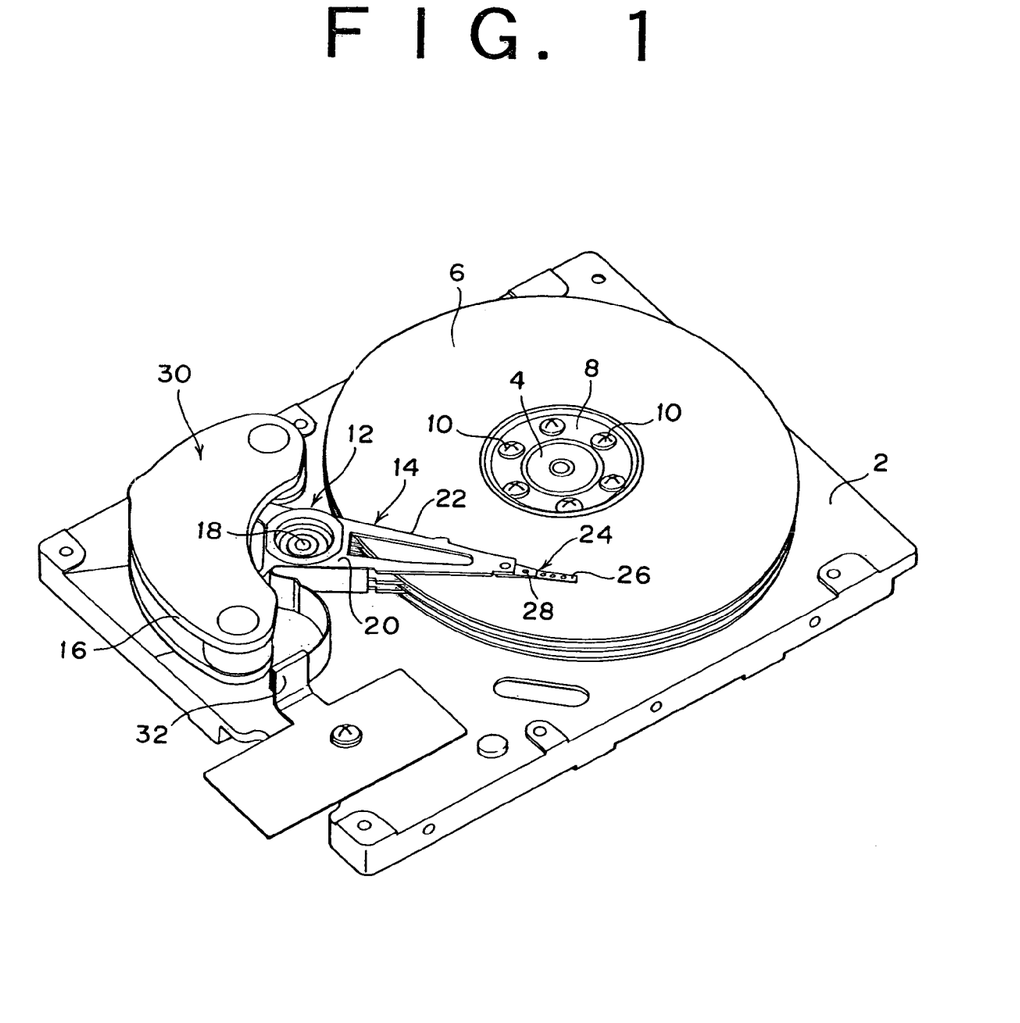
FIG. 1 is a perspective view of a magnetic disk drive with a cover removed.

Some preferred embodiments of the present invention will now be described with reference to the drawings. Throughout the drawings, substantially the same parts are denoted by the same reference numerals. Referring to FIG. 1, there is shown a perspective view of a magnetic disk drive in the condition where a cover is removed. A shaft 4 is fixed to a base 2, and a spindle hub (not shown) is rotatably mounted on the shaft 4. The spindle hub is driven by a DC motor (not shown) to rotate about the shaft 4. A plurality of magnetic disks 6 and spacers (not shown) are mounted on the spindle hub so as to be alternately stacked. That is, the plural magnetic disks 6 are fixedly mounted on the spindle hub by securing a disk clamp 8 to the spindle hub by means of a plurality of screws 10, and are equally spaced a given distance by the spacers.

Reference numeral 12 denotes a rotary actuator consisting of an actuator arm assembly 14 and a magnetic circuit 16. The actuator arm assembly 14 is rotatable about a shaft 18 fixed to the base 2. The actuator arm assembly 14 includes an actuator block 20 rotatably mounted on the shaft 18 through a pair of bearings (not shown), a plurality of actuator arms 22 extending horizontally from the actuator block 20 in one direction, and a head assembly 24 fixed to a front end portion of each actuator arm 22. Each head assembly 24 includes a magnetic head slider 26 having an electromagnetic transducer (magnetic head element) for reading/writing data from/to the corresponding magnetic disk 6, and a suspension 28 having a front end portion supporting the head slider 26 and a base end portion fixed to the corresponding actuator arm 22.

A coil (not shown) is supported on the opposite side of the actuator arms 22 with respect to the shaft 18. The coil is inserted in a gap of the magnetic circuit 16. The magnetic circuit 16 and the coil constitute a voice coil motor (VCM) 30. Reference numeral 32 denotes a flexible printed circuit board (FPC) for supplying a write signal to the electromagnetic transducer and for taking a read signal from the electromagnetic transducer. One end of the flexible printed circuit board 32 is fixed to a side surface of the actuator block 20.

Figure 2A:
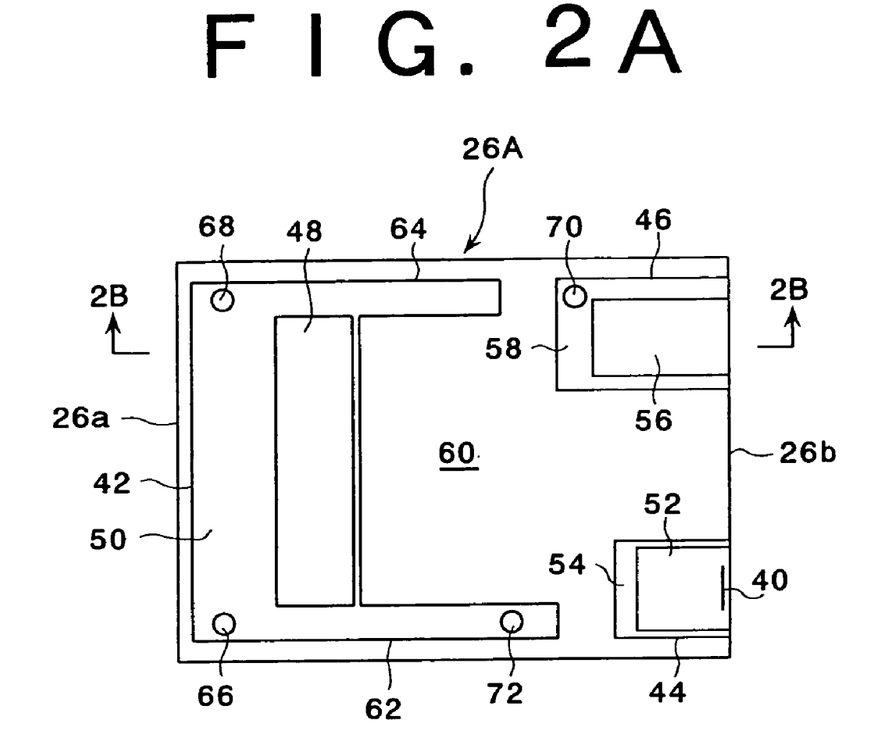
FIG. 2A is a plan view of a magnetic head slider according to a first preferred embodiment of the present invention.
Figure 2B:
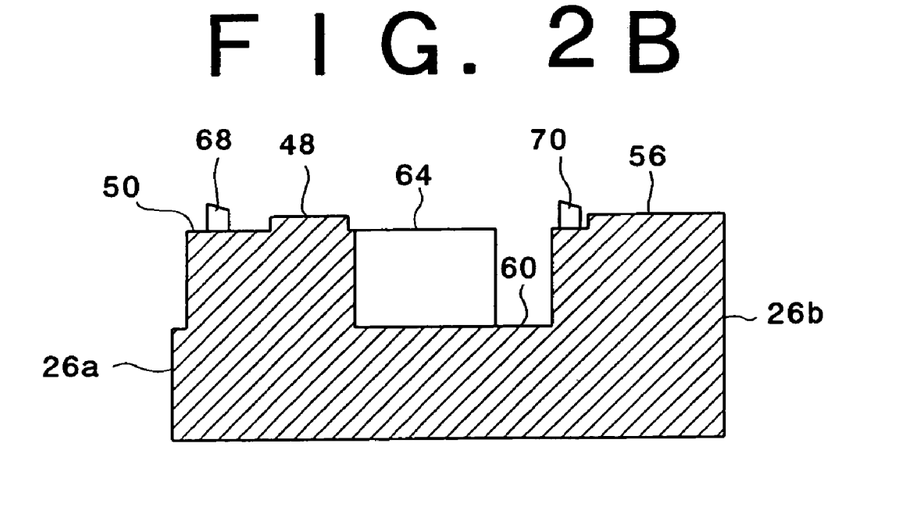
FIG. 2B is a cross sectional view taken along the line 2B—2B in FIG. 2A.

Referring to FIG. 2A, there is shown a plan view of a magnetic head slider 26A according to a first preferred embodiment of the present invention. FIG. 2B is a cross sectional view taken along the line 2B—2B in FIG. 2A. The magnetic head slider 26A is in the form of rectangular parallelepiped, and has an air inlet end 26a and an air outlet end 26b. The magnetic head slider 26A is a negative pressure type head slider, which has a front rail 42 formed adjacent to the air inlet end 26a and a pair of rear rails 44 and 46 formed adjacent to the air outlet end 26b.

The front rail 42 is formed on its top surface with an air bearing surface 48 extending in the transverse direction of the head slider 26A and a step surface 50 lower in level than the air bearing surface 48. Similarly, the rear rails 44 and 46 are formed with air bearing surfaces 52 and 56 and step surfaces 54 and 58 lower in level than the air bearing surfaces 52 and 56, respectively.

The air bearing surface 52 is smaller in area than the air bearing surface 56. Accordingly, a flying force applied to the air bearing surface 56 is larger than that applied to the air bearing surface 52 in the head slider 26A. An electromagnetic transducer 40 is formed near the air outlet end of the rear rail 44, and the distance between the head slider 26A and the disk surface during rotation of the magnetic disk is minimum near the electromagnetic transducer 40.

When the magnetic disk is rotated to generate an air flow along the disk surface, the air flow acts on the air bearing surfaces 48, 52, and 56. As a result, flying forces for flying the head slider 26A above the disk surface are generated on the air bearing surfaces 48, 52, and 56. While flying forces are also generated on the step surfaces 50, 54, and 58, these flying forces are not so large. In the head slider 26A, the area of the air bearing surface 48 is relatively large, so that a relatively large flying force is generated on the air bearing surface 48 during rotation of the disk. As a result, the head slider 26A is maintained in an inclined attitude at a pitch angle $\alpha$ such that the air inlet end 26a is tilted up. The pitch angle $\alpha$ is a tilt angle of the head slider 26A with respect to the direction of the air flow.

A pair of side rails 62 and 64 extend from the transverse ends of the front rail 42 toward the rear rails 44 and 46, respectively. A groove 60 is formed downstream of the front rail 42. The groove 60 has a depth of about 2 to 3 $\mu$m. Accordingly, when passing the air bearing surface 48 of the front rail 42, the air flow is expanded in the groove 60 in a direction perpendicular to the disk surface, thereby generating a negative pressure in the groove 60. This negative pressure comes into balance with the above-mentioned flying forces applied to the air bearing surfaces 48, 52, and 56, thereby defining a flying height of the head slider 26A.

Pads 66 and 68 are formed on the step surface 50 of the front rail 42, and a pad 70 is formed on the step surface 58 of the rear rail 46. Further, a pad 72 is formed on the side rail 62. In this head slider 26A, the pad 72 on the rear rail 44 side where a relatively small flying force is generated is positioned upstream of the pad 70 on the rear rail 46 side where a relatively large flying force is generated. By positioning the pad 72 upstream of the pad 70 as mentioned above, it is possible to prevent the pad 72 from coming into contact with the disk surface during rotation of the disk. These pads 66, 68, 70, and 72 have substantially the same height, and each pad has an inclined upper end surface with a given inclination angle such that the height on the upstream side is larger than the height on the downstream side.

Figure 3:
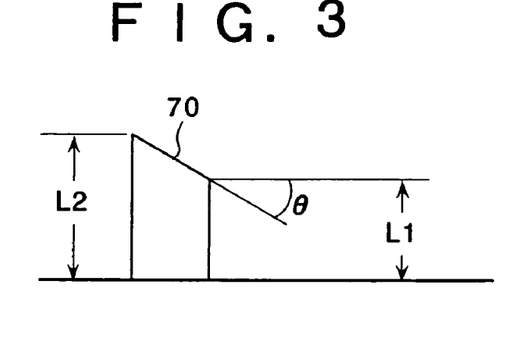
FIG. 3 is an enlarged view of a pad in the first preferred embodiment.

FIG. 3 is an enlarged view of the pad 70. In FIG. 3, L1 denotes the height of a conventional pad, and L2 indicates the height of the pad 70 on the upstream side thereof, wherein L2 is larger than L1 and the pad 70 has an inclined upper end surface with a given inclination angle $\theta$. The other pads 66, 68, and 72 have similar inclined upper end surfaces. In each of at least the pads 70 and 72 located near the air outlet end, the inclination angle $\theta$ is set less than or equal to the pitch angle in flying the slider. By setting the inclination angle $\theta$ less than or equal to the pitch angle in flying the slider, the lowest point of the slider in the flying condition is not changed regardless of the fact that the height L2 of the pad 70 on the upstream side is larger than the height L1 of the conventional pad. Accordingly, the spacing loss can be avoided and the stiction margin between the head slider and the magnetic disk can be increased. In each of the pads 66 and 68 located near the air inlet end, the inclination angle $\theta$ is not necessarily set less than or equal to the pitch angle in flying the slider, because the pads 66 and 68 fly relatively highly from the disk surface in flying the slider. However, the inclination angle $\theta$ of each of the pads 66 and 68 is preferably set equal to the inclination angle $\theta$ of each of the pads 70 and 72 from the viewpoint of simplification of a manufacturing process.

Figure 4A:
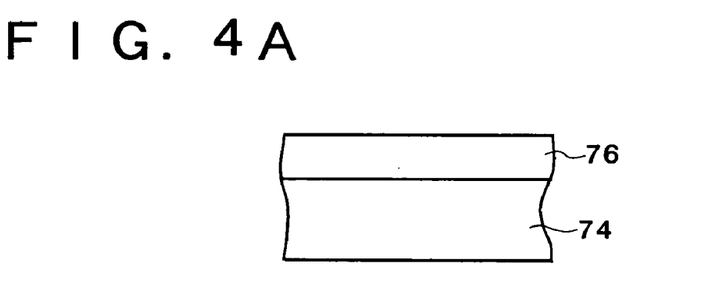
FIGS. 4A to 4C are schematic views for illustrating a pad forming method in the first preferred embodiment.
Figure 4B:
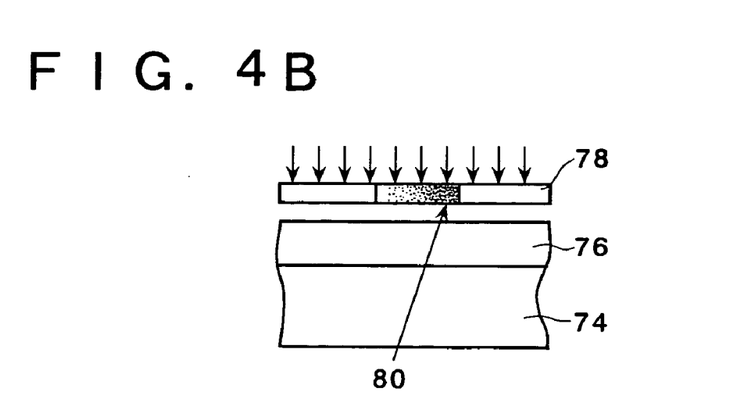
Figure 4C:
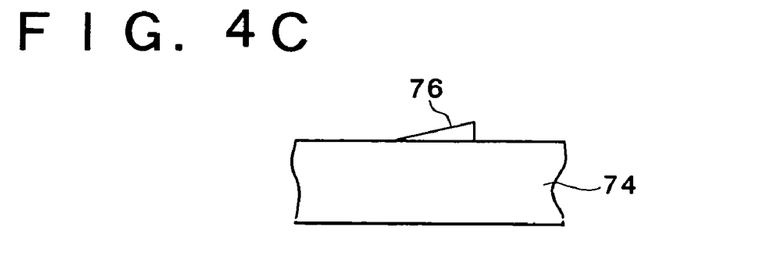

A forming method for such a pad having an inclined upper end surface will now be described with reference to FIGS. 4A to 4C. As shown in FIG. 4A, a resist 76 is applied to the upper surface of a slider material 74. As shown in FIG. 4B, the resist 76 is exposed to light with a shading mask 78 placed over the upper surface of the resist 76. Reference numeral 80 denotes a shading portion formed in the shading mask 78. By using the shading mask 78 to control the amount of light transmission and to perform the exposure and development, an inclined portion of the resist 76 is left on the upper surface of the slider material 74 as shown in FIG. 4C. By performing ion milling in this condition, the pad can be formed with an inclined end surface.

Figure 5A:
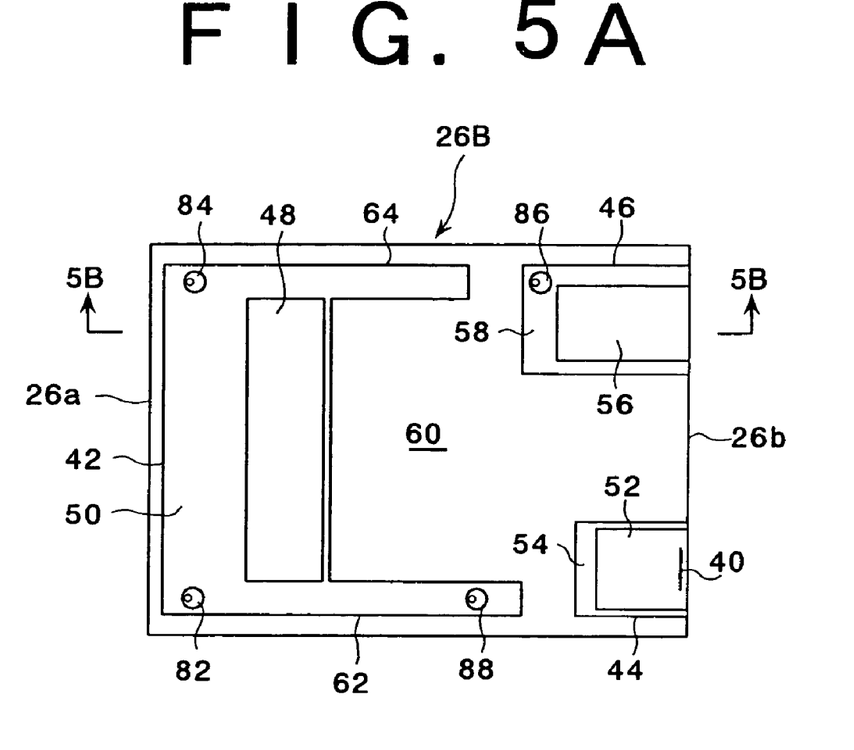
FIG. 5A is a plan view of a magnetic head slider according to a second preferred embodiment of the present invention.
Figure 5B:
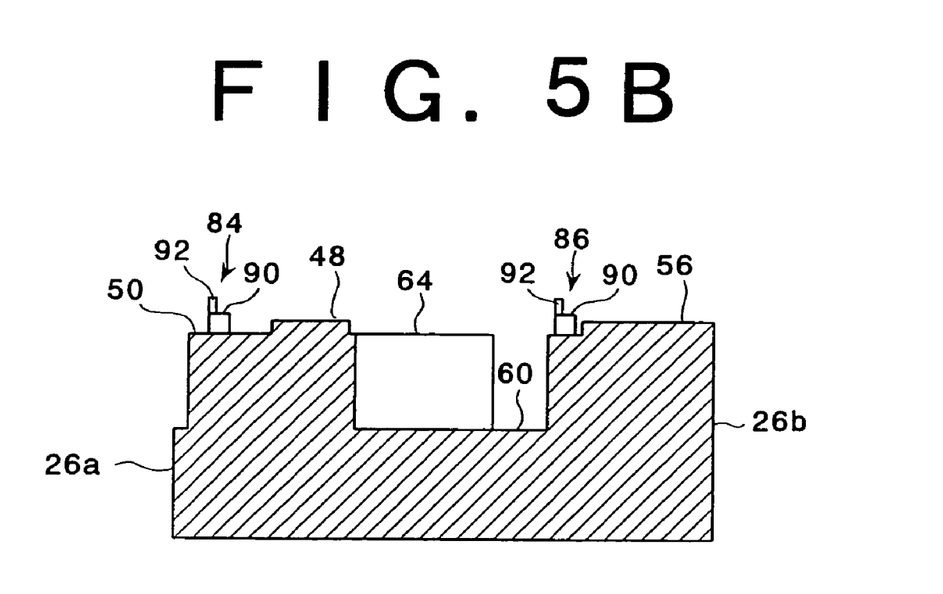
FIG. 5B is a cross sectional view taken along the line 5B—5B in FIG. 5A.
Figure 6:
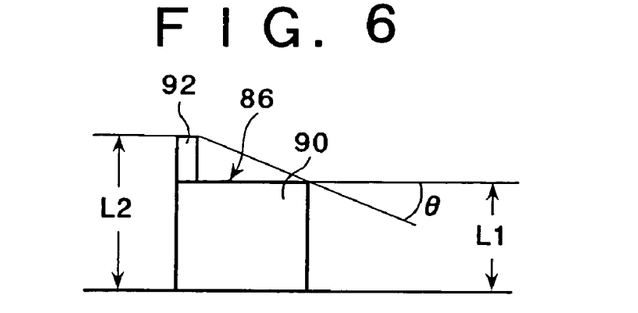
FIG. 6 is an enlarged view of a pad in the second preferred embodiment.

Referring next to FIG. 5A, there is shown a plan view of a magnetic head slider 26B according to a second preferred embodiment of the present invention. FIG. 5B is a cross sectional view taken along the line 5B—5B in FIG. 5A. In this preferred embodiment, pads 82, 84, 86, and 88 are provided in place of the pads 66, 68, 70, and 72, respectively, shown in FIG. 2A. FIG. 6 is an enlarged view of the pad 86. The other pads 82, 84, and 88 are substantially the same in shape as the pad 86. As shown in FIG. 6, the pad 86 is composed of a base pad 90 having a first sectional area and an auxiliary pad 92 formed on the base pad 90. The auxiliary pad 92 has a second sectional area smaller than the first sectional area. The auxiliary pad 92 is formed on the horizontal upper end surface of the base pad 90 at its upstream end. In each of at least the pads 86 and 88 located near the air outlet end, the angle θ formed between a horizontal plane and a straight line connecting the downstream end of the upper end surface of the base pad 90 and the downstream end of the upper end surface of the auxiliary pad 92 is set less than or equal to the pitch angle in flying the slider. In each of the pads 82 and 84 located near the air inlet end, the angle θ is not necessarily set less than or equal to the pitch angle in flying the slider. However, the angle θ of each pad is preferably set to substantially the same angle from the viewpoint of simplification of a manufacturing process. The other configuration of this preferred embodiment is similar to that of the first preferred embodiment shown in FIGS. 2A and 2B.

Figure 7A:
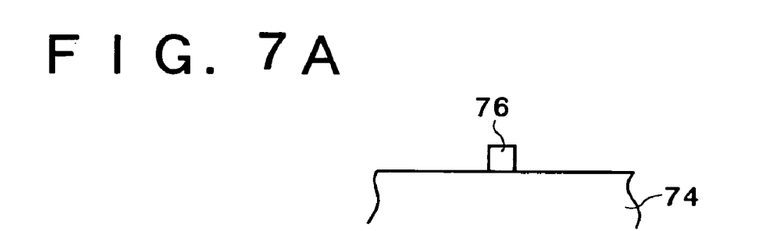
FIGS. 7A to 7C are schematic views for illustrating a pad forming method in the second preferred embodiment.
Figure 7B:
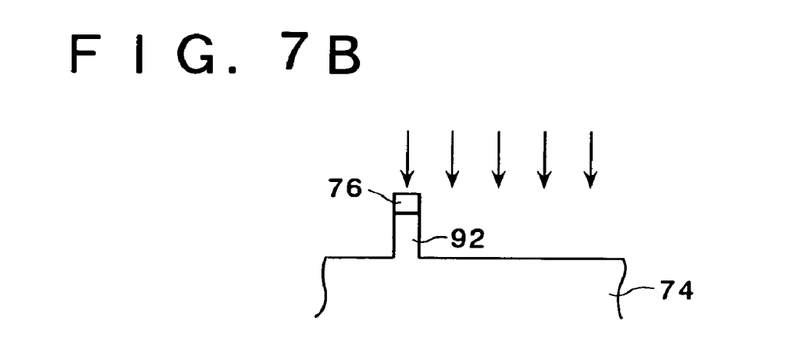
Figure 7C:
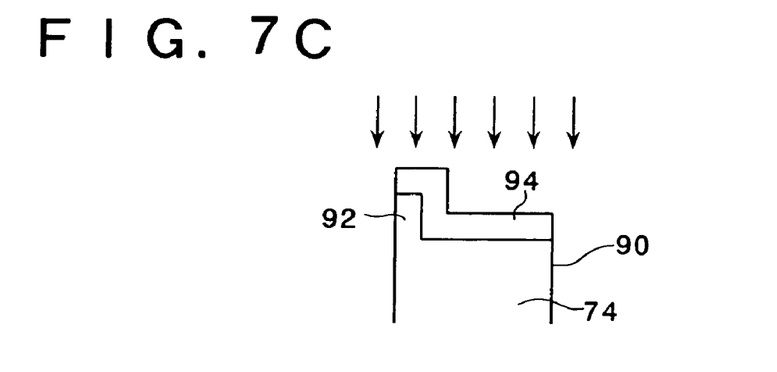

A forming method for each pad in this preferred embodiment will now be described with reference to FIGS. 7A to 7C. As shown in FIG. 7A, an auxiliary pad region of a slider material 74 is masked by a resist 76. As shown in FIG. 7B, ion milling is performed to form the auxiliary pad 92. As shown in FIG. 7C, a flying surface pad region of the slider material 74 including the auxiliary pad 92 is masked by a resist 94, and ion milling is performed again to form the base pad 90. Thus, the two-stage pad composed of the base pad 90 and the auxiliary pad 92 can be formed.

Figure 8A:
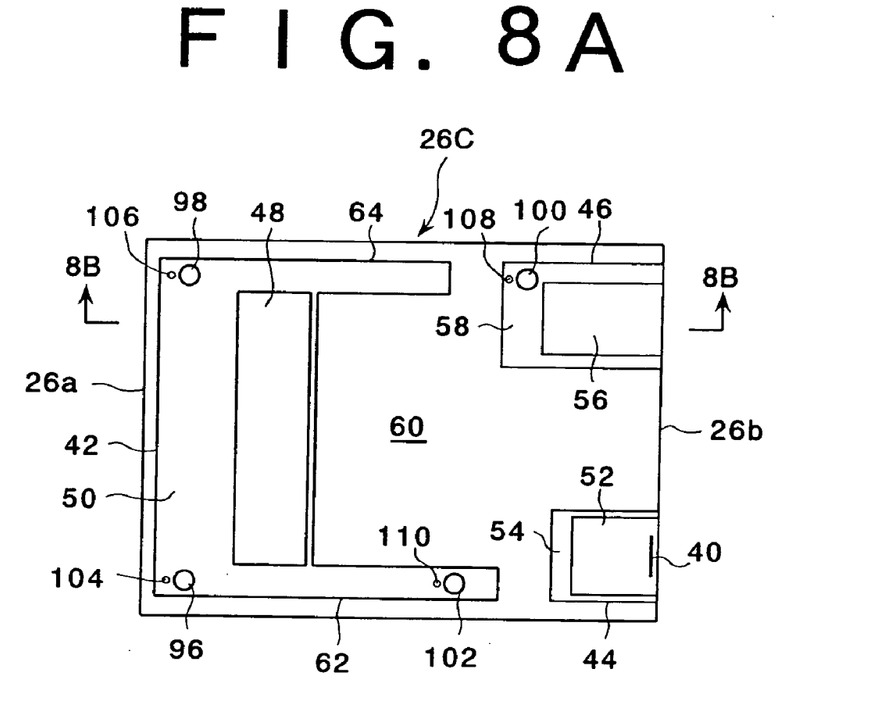
FIG. 8A is a plan view of a magnetic head slider according to a third preferred embodiment of the present invention.
Figure 8B:
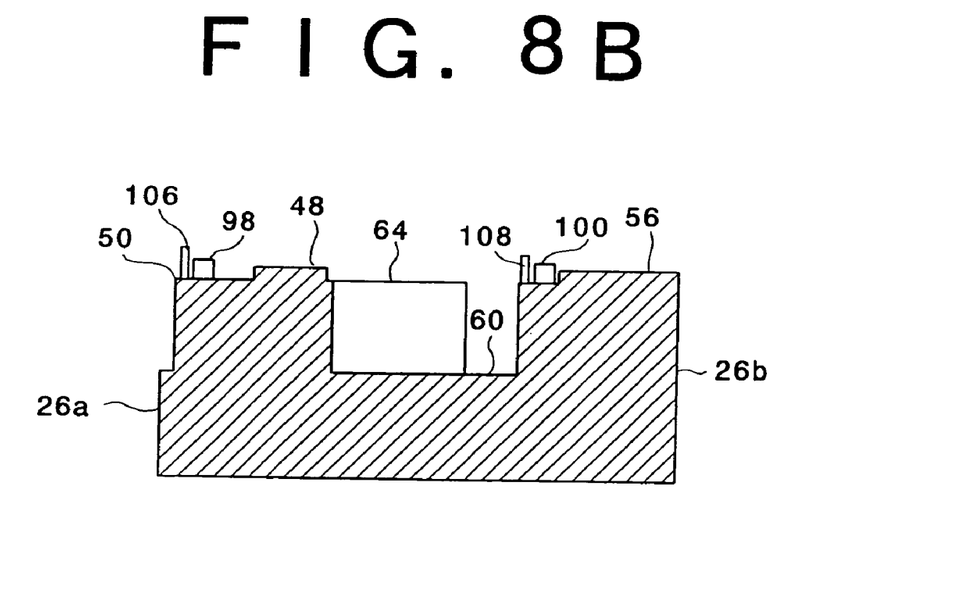
FIG. 8B is a cross sectional view taken along the line 8B—8B in FIG. 8A.
Figure 9:
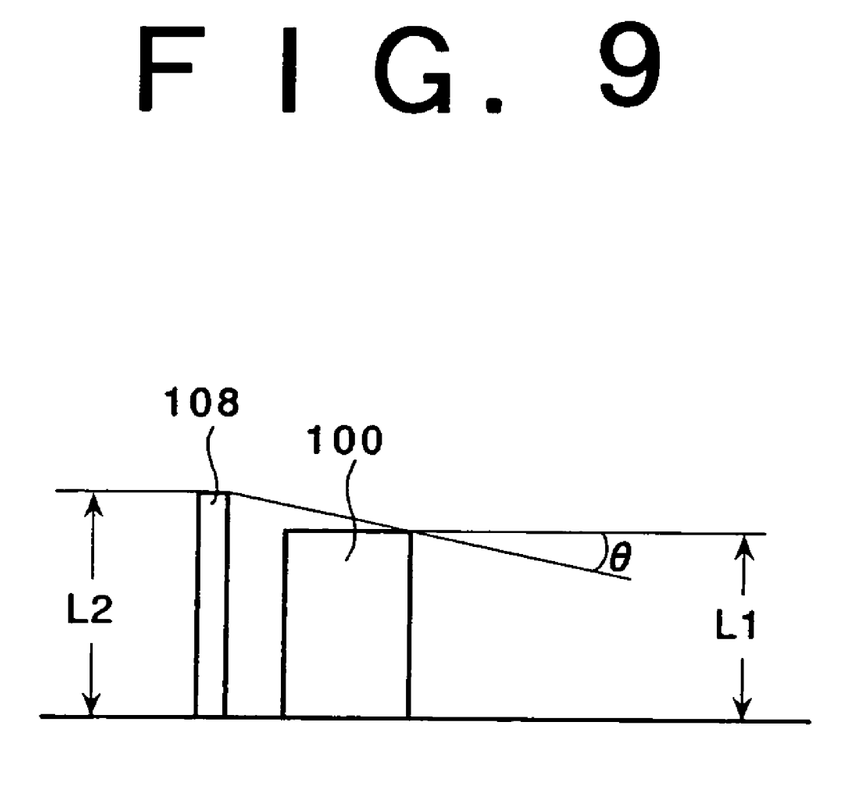
FIG. 9 is an enlarged view of a pad and an auxiliary pad in the third preferred embodiment.

Referring next to FIG. 8A, there is shown a plan view of a magnetic head slider 26C according to a third preferred embodiment of the present invention. FIG. 8B is a cross sectional view taken along the line 8B—8B in FIG. 8A. In the head slider 26C of this preferred embodiment, pads 96, 98, 100, and 102 each having a horizontal upper end surface are located in place of the pads 66, 68, 70, and 72 shown in FIG. 2A, respectively, and auxiliary pads 104, 106, 108, and 110 each having a small diameter are located adjacent to the pads 96, 98, 100, and 102, respectively, on the upstream side thereof. The auxiliary pads 104, 106, 108, and 110 are higher than the pads 96, 98, 100, and 102. FIG. 9 is an enlarged view of the pad 100 and the corresponding auxiliary pad 108. As shown in FIG. 9, the angle θ formed between a horizontal plane and a straight line connecting the downstream end of the upper end surface of the pad 100 and the downstream end of the upper end surface of the auxiliary pad 108 is set less than or equal to the pitch angle in flying the slider. This relation is also adapted similarly to the pad 102 and the auxiliary pad 110. In the combination of the pad 96 and the auxiliary pad 104 and the combination of the pad 98 and the auxiliary pad 106, the angle θ is not necessarily set less than or equal to the pitch angle in flying the slider. However, the angle θ of each combination of the pad and the auxiliary pad is preferably set to substantially the same angle from the viewpoint of simplification of a manufacturing process.

A forming method for each pad and each auxiliary pad in this preferred embodiment is similar to the forming method of the second preferred embodiment shown in FIGS. 7A to 7C. First, an auxiliary pad region of a slider material is masked by a resist, and ion milling is next performed to remove the slider material by a given amount. Next, the auxiliary pad region and a pad region are masked by a resist to perform ion milling again, thereby forming the pad and the auxiliary pad having different heights.

The auxiliary pads in the magnetic head sliders 26B and 26C according to the second and third preferred embodiments are provided to cope with the initial stiction occurring in assembling or transporting the disk drive. Accordingly, the reliability of the auxiliary pads is not significant, so that the diameter of each auxiliary pad may be made sufficiently small. Further, even when each auxiliary pad is changed in height due to wearing after actually operating the disk drive, there is no problem.

Figure 10A:
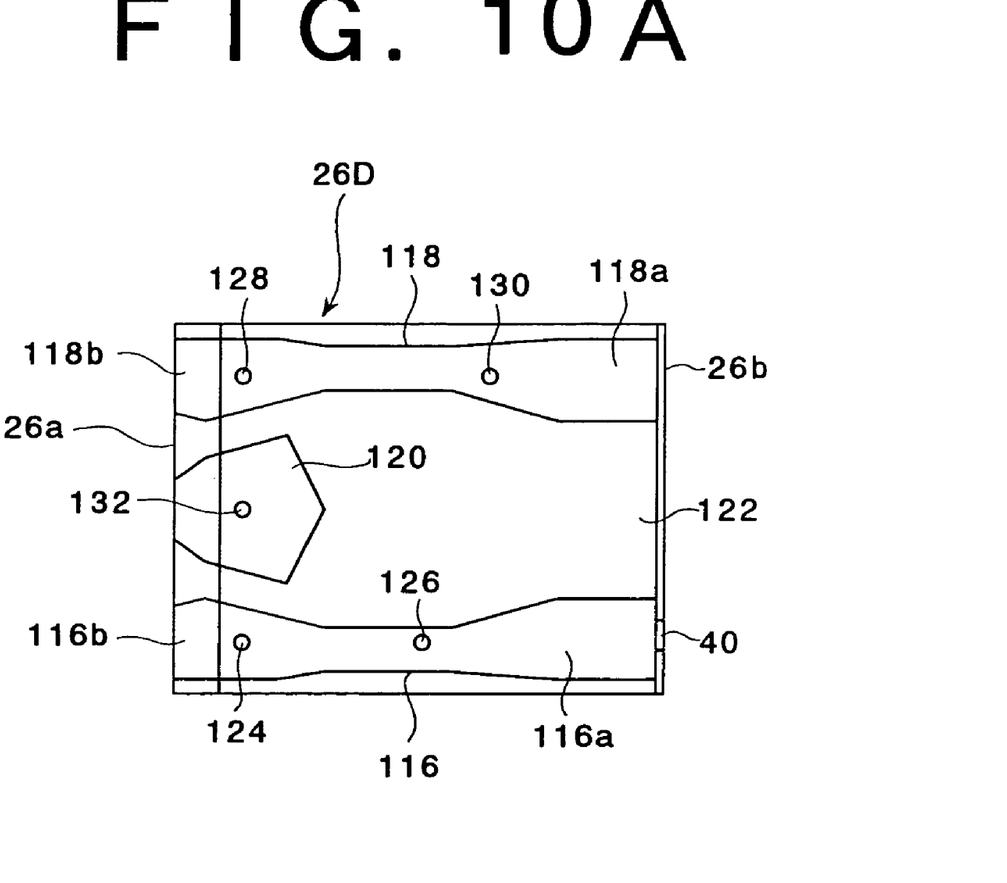
FIG. 10A is a plan view of a magnetic head slider according to a fourth preferred embodiment of the present invention.
Figure 10B:
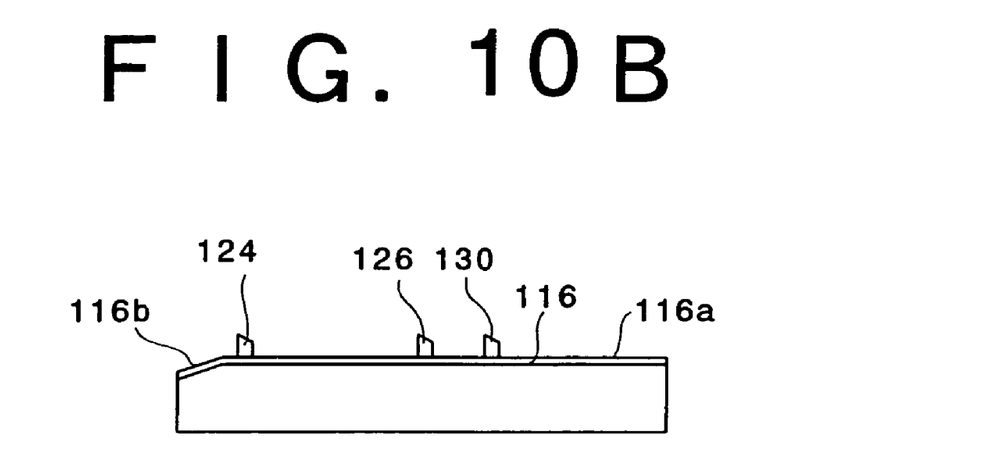
FIG. 10B is an elevational view of FIG. 10A.

Referring next to FIG. 10A, there is shown a plan view of a magnetic head slider 26D according to a fourth preferred embodiment of the present invention. FIG. 10B is an elevational view of the head slider 26D shown in FIG. 10A. The head slider 26D has an air inlet end 26a and an air outlet end 26b. The disk opposing surface of the head slider 26D is formed with a pair of rails 116 and 118 for generating a positive pressure. The rails 116 and 118 have flat air bearing surfaces 116a and 118a for generating flying forces during rotation of the disk, respectively. The rails 116 and 118 are further formed with tapering surfaces 116b and 118b adjacent to the air inlet end 26a, respectively. The disk opposing surface of the head slider 26D is further formed with a center rail 120 between the rails 116 and 118 at a longitudinal position near the air inlet end 26a. A groove 122 is formed between the rails 116 and 118 on the downstream side of the center rail 120, so as to generate a negative pressure by the expansion of air once compressed near the air inlet end 26a.

An electromagnetic transducer 40 is formed near the air outlet end 26b of the head slider 26D at a transverse position where the rail 116 is located. By adopting such a structure that the flying height of the rail 116 is smaller than the flying height of the rail 118, the flying height of the air outlet end 26b of the rail 116 becomes minimum in flying the slider. Accordingly, the electromagnetic transducer 40 formed near the air outlet end 26b of the rail 116 can be brought extremely close to the disk surface during rotation of the disk, so that this head slider is suitable for high-density reading/writing of information. The flying height of the rail 116 can be made smaller than that of the rail 118 by adopting such a structure that the width of a region of the rail 116 extending from the longitudinal center of the rail 116 to the air outlet end 26b is set smaller than the width of a corresponding region of the rail 118.

A pair of pads 124 and 126 are formed on the air bearing surface 116a of the rail 116, and a pair of pads 128 and 130 are formed on the air bearing surface 118a of the rail 118. Further, a pad 132 is also formed on the center rail 120. Each of these pads 124 to 132 has an inclined upper end surface with a given inclination angle θ such that the upstream end of the inclined upper end surface is higher than the downstream end thereof as similar to the pad 70 shown in FIG. 3. In each of at least the pads 126 and 130 located near the air outlet end, the inclination angle θ is set less than or equal to the pitch angle in flying the slider. In each of the pads 124, 128, and 132 located near the air inlet end, the inclination angle θ is not necessarily set less than or equal to the pitch angle in flying the slider. However, the inclination angle θ of each pad is preferably set to substantially the same angle from the viewpoint of simplification of a manufacturing process.

According to the present invention as described above, the upper end surface of each pad for preventing the stiction is inclined so that the upstream side is higher than the downstream side, or the thin auxiliary pad higher than each pad is located on the upstream side of each pad. With this configuration, the height of each pad can be substantially increased without changing the lowest flying point of the slider in flying the slider, so that the stiction margin between the head slider and the magnetic disk upon stoppage of operation of the disk drive can be enlarged. Although the height of each pad is substantially increased, the lowest flying point of the slider in the flying condition does not change, so that there is no influence on the reliability of the head/disk interface (HDI) in flying the slider. Accordingly, it is possible to prevent the stiction between the head slider and the magnetic disk due to an initial error occurring in assembling or transporting the disk drive, thereby preventing impairment of the reliability of the disk drive.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A head slider having an air inlet end, an air outlet end, and a disk opposing surface opposed to a disk, comprising:
 a front rail formed on said disk opposing surface at a longitudinal position adjacent to said air inlet end, said front rail having a flat air bearing surface for generating a flying force during rotation of said disk;
 a pair of rear rails formed on said disk opposing surface at a longitudinal position adjacent to said air outlet end, each of said rear rails having a flat air bearing surface for generating a flying force during rotation of said disk;
 a groove formed downstream of said front rail for generating a negative pressure by expanding air once compressed at said front rail;
 a transducer formed near said air outlet end at a transverse position where one of said rear rails is formed; and
 a plurality of pads formed on said front rail and on at least one of said rear rails;
 wherein at least said pads that are formed on said front rail have a side surface substantially normal to said air bearing surface of corresponding said front and rear rails, a first height, a second height and an inclined upper end surface extending from said first height to said second height with a given inclination angle such that the upstream end of said inclined upper end surface is higher in level than the downstream end thereof.

2. A head slider according to claim 1, wherein said given inclination angle is less than or equal to a pitch angle in flying said slider.

3. A head slider according to claim 1, wherein each of said front rail and said rear rails has a step surface adjacent to said corresponding air bearing surface and lower in level than said corresponding air bearing surface;
 each of said pads being formed on said step surface.

4. A head slider having an air inlet end, an air outlet end, and a disk opposing surface opposed to a disk, comprising:
 a front rail formed on said disk opposing surface at a longitudinal position adjacent to said air inlet end, said front rail having a flat air bearing surface for generating a flying force during rotation of said disk;
 a pair of rear rails formed on said disk opposing surface at a longitudinal position adjacent to said air outlet end, each of said rear rails having a flat air bearing surface for generating a flying force during rotation of said disk;
 a groove formed downstream of said front rail for generating a negative pressure by expanding air once compressed at said front rail;
 a transducer formed near said air outlet end at a transverse position where one of said rear rails is formed; and
 a plurality of pads formed on said front rail and at least one of said rear rails;
 each of said pads including a base pad having a first sectional area and an auxiliary pad formed on said base pad, said auxiliary pad having a second sectional area smaller than said first sectional area.

5. A head slider according to claim 4, wherein the angle formed between a horizontal plane and a straight line connecting the downstream end of the upper end surface of said base pad and the downstream end of the upper end surface of said auxiliary pad is less than or equal to a pitch angle in flying said slider.

6. A head slider according to claim 4, wherein each of said front rail and said rear rails has a step surface adjacent to said corresponding air bearing surface and lower in level than said corresponding air bearing surface;
 each of said pads being formed on said step surface.

7. A disk drive comprising:
 a housing having a base;
 a disk rotatably mounted in said housing and having a plurality of tracks;
 a head slider having an air inlet end, an air outlet end, and a disk opposing surface opposed to said disk; and
 an actuator for moving said head slider across said tracks of said disk;
 said actuator comprising:
 an actuator arm rotatably mounted on said base;
 a suspension fixed at a base end portion thereof to a front end portion of said actuator arm; and
 said head slider mounted on a front end portion of said suspension;
 said head slider comprising:
 a front rail formed on said disk opposing surface at a longitudinal position adjacent to said air inlet end, said front rail having a flat air bearing surface for generating a flying force during rotation of said disk;
 a pair of rear rails formed on said disk opposing surface at a longitudinal position adjacent to said air outlet end, each of said rear rails having a flat air bearing surface for generating a flying force during rotation of said disk;
 a groove formed downstream of said front rail for generating a negative pressure by expanding air once compressed at said front rail;
 a transducer formed near said air outlet end at a transverse position where one of said rear rails is formed; and
 a plurality of pads formed on said front rail and at least one of said rear rails;
 wherein at least said pads that are formed on said front rail have a side surface substantially normal to said air bearing surface of corresponding said front and rear rails, a first height, a second height and an inclined upper end surface extending from said first height to said second height with a given inclination angle such that the upstream end of said inclined upper end surface is higher in level than the downstream end thereof.

8. A disk drive comprising:
 a housing having a base;
 a disk rotatably mounted in said housing and having a plurality of tracks;
 a head slider having an air inlet end, an air outlet end, and a disk opposing surface opposed to said disk; and
 an actuator for moving said head slider across said tracks of said disk;
 said actuator comprising:
 an actuator arm rotatably mounted on said base;
 a suspension fixed at a base end portion thereof to a front end portion of said actuator arm; and
 said head slider mounted on a front end portion of said suspension;
 said head slider comprising:
 a front rail formed on said disk opposing surface at a longitudinal position adjacent to said air inlet end, said front rail having a flat air bearing surface for generating a flying force during rotation of said disk;

a pair of rear rails formed on said disk opposing surface at a longitudinal position adjacent to said air outlet end, each of said rear rails having a flat air bearing surface for generating a flying force during rotation of said disk;

a groove formed downstream of said front rail for generating a negative pressure by expanding air once compressed at said front rail;

a transducer formed near said air outlet end at a transverse position where one of said rear rails is formed; and a plurality of pads formed on said front rail and at least one of said rear rails;

each of said pads having a base pad having a first sectional area and an auxiliary pad formed on said base pad, said auxiliary pad having a second sectional area smaller than said first sectional area.

* * * * *